April 14, 1931.    J. HYPES    1,800,798
BIRD CAGE FASTENER
Filed June 11, 1929
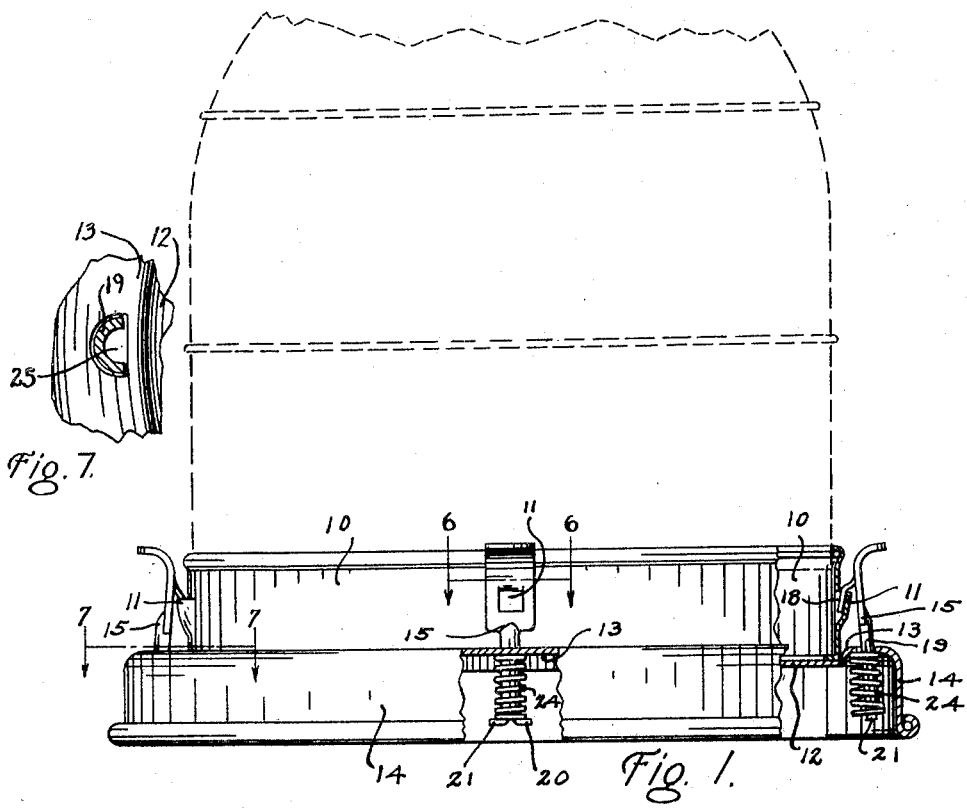
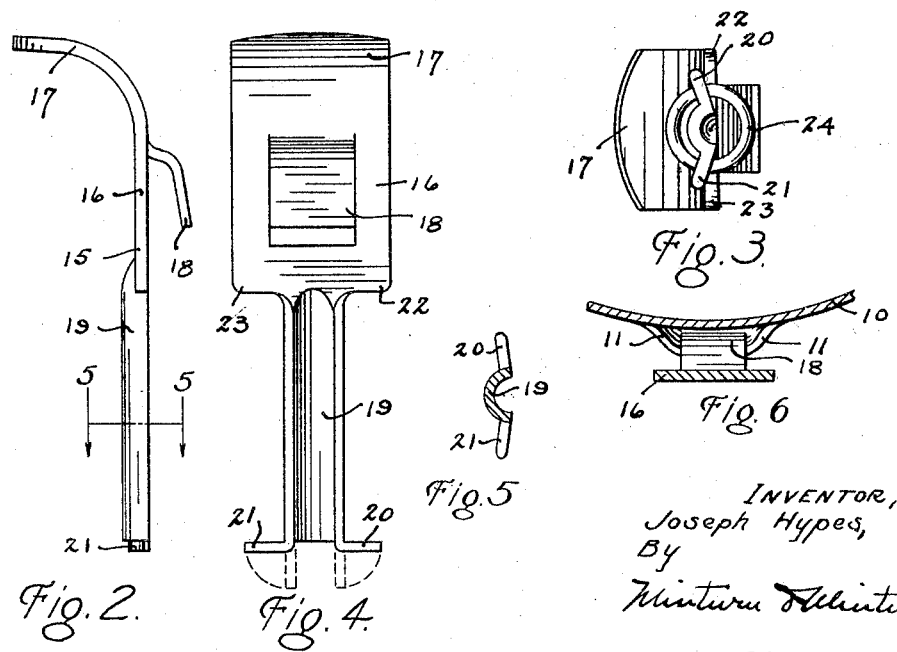
INVENTOR,
Joseph Hypes,
By
Minturn & Minturn,
Attorneys.

Patented Apr. 14, 1931

1,800,798

UNITED STATES PATENT OFFICE

JOSEPH HYPES, OF INDIANAPOLIS, INDIANA, ASSIGNOR, BY MESNE ASSIGNMENTS, TO INDIANAPOLIS CAGE CORPORATION, OF INDIANAPOLIS, INDIANA

BIRD-CAGE FASTENER

Application filed June 11, 1929. Serial No. 370,037.

This invention relates generally to bird cages and particularly to means for fastening a lower pan to the cage proper.

The primary objects of the invention reside in the provision of a latch that will positively secure the relative parts on to the other so as to eliminate any accidental slipping of the latch; in the provision of latch means very simply and economically made, permitting the use of a stamping process; and in the provision of means that may be quickly and readily assembled without the use of cotter pins and the like.

These and other objects will become apparent in the following description of the invention, with reference being made to the accompanying drawing, in which,—

Fig. 1 is a fragmentary side elevation of the lower portion of a bird cage, with the super structure indicated by dash lines;

Fig. 2, a side elevation of the latch member;

Fig. 3, a bottom plan view of the same member with a compression spring mounted thereon;

Fig. 4, a rear elevation of the member;

Fig. 5, a horizontal section on the line 5—5 in Fig. 2;

Fig. 6, a transverse section on the line 6—6 in Fig. 1; and

Fig. 7, a section on the line 7—7 in Fig. 1.

Like characters of reference indicate like parts throughout the several views in the drawing.

Referring first to Fig. 1, I form a bird cage to have a lower band 10 from the vertical face of which I press out lips 11 forming thereby cup like openings through the band with the upwardly and outwardly projecting lips therearound.

I form a base 12 substantially in the form of a flat plate completely enclosing the space defined by the band 10 to have an annular shoulder 13 projecting upwardly around the outer lower end of the band 10 and extending around and downwardly to form an enclosing annular apron 14 so as to support the plate at an appreciable distance above the lower edge of the apron 14.

I form a latch member generally designated by the numeral 15 preferably by stamping it out of sheet metal. This member has a substantially flat upper portion 16 with its upper end bent outwardly and around to form the finger grip 17. From the portion 16 a tongue 18 is pressed rearwardly therefrom to extend first outwardly and thence downwardly, as shown in Figs. 1 and 2. The lower end of the latch member below the portion 16 consists essentially of a half round column 19 open from the rear side. From the lower end of the column 19 initially project the tongues 20 and 21 vertically downwardly.

The column 19 being of less horizontal width than that of the portion 16, shoulders 22 and 23 are left on the under side of the portion 16. The latch member 15 as so described is inserted through a hole 25, Fig. 7, provided in the horizontal area of the base 12 between the shoulder 13 and the upper end of the apron 14. One of such holes is provided at spaced intervals for each of the lips 11, and each hole 25 is half-round in shape, Fig. 7, so that the column 19 may slide freely therethrough but cannot rotate in the hole and can only be assembled in the hole with the tongue 18 turned the proper direction.

The member 15 is inserted through the hole 25 and a compression spring 24 is positioned around the column 19 from the under side of the bottom 12 and is sufficiently compressed to permit the tongues 20 and 21 to be bent outwardly to prevent removal of the spring therefrom.

The spring 24 is of sufficient length that when compressed and held between tongues 20 and 21, the member 15 travels downwardly through the hole until the shoulders 22 and 23 contact its edges from the upper side, this being the normal position of each of the latch members 15 when assembled with the base 12.

To operate the latch members, the cage with its lower band 10 is positioned on the base 12 to have the band 10 positioned and held against horizontal displacement by the shoulder 13. The latch members 15 are then raised to bring the tongues 18 up over the lips 11 whereupon the members 15 are released to let the members be pulled downwardly by their springs 24 and thereby held by the engagement of the tongues 18 over the lips. Thus it will be seen that the latch members may not easily be displaced from their engagements with the lips 11 by any accidental blow directed horizontally against them. The tongues 18 can not slide horizontally over the lips 11 by reason of the cup like formation pressed from the band 10 to produce the lips 11.

I claim:—

In a device of the character specified, a sheet metal member having a pressed-out structure with sides and an oblique front, a second sheet metal member having a portion substantially at right angles to the first member, said right angle portion having a half-round hole, a latch member stamped out of sheet metal having a flat portion with a tongue pressed therefrom to engage the oblique portion of the first member, the end of said flat portion bent to form a finger grip, and the sheet metal, on the outer side of the tongue from the finger grip bent into a half-round column forming shoulders at the junction of the column with the flat portion, said half-round column assembled with a sliding fit through the half-round hole of the second sheet metal member and a compression spring on the column retained by bending the fingers angularly of the column.

In testimony whereof I affix my signature.

JOSEPH HYPES.